June 6, 1950 B. F. WHEELER 2,510,787

VARIABLE REACTANCE CIRCUIT

Filed May 16, 1947

INVENTOR.

Benjamin F. Wheeler

BY Barry Tunick

ATTORNEY

Patented June 6, 1950

2,510,787

UNITED STATES PATENT OFFICE 2,510,787

VARIABLE REACTANCE CIRCUIT

Benjamin F. Wheeler, Haddonfield, N. J., assignor to Radio Corporation of America, a corporation of Delaware Application May 16, 1947, Serial No. 748,415

9 Claims. (Cl. 178—44)

In the radio art, there is great need of a simple method of and means for modulating an oscillation generator through a wider frequency range than can be accomplished with known modulators, such as, a phase shift type reactance tube, mechanically variable condensers, inductances and the like. Moreover, the modulation must be linear over the modulation frequency range.

In attaining this purpose, I devised what I believe to be a new variable reactance primarily capacitive in character which is variable through a relatively wide range.

My improved reactance comprises two tubes with their anode impedances in parallel. One tube is operated as an amplifier, the gain of which is controlled by its grid bias voltage, and has an appreciable anode to grid capacity which may include external capacity. The other tube forms the resistive load in the plate circuit of the first tube and its grid bias is controlled differentially with respect to variations of the bias on the first tube. The anode to cathode voltage of the amplifier tube is thus varied in two ways. First, by its gain and second, by its load impedance. If alternating current is applied between the grid and cathode of the amplifier tube, an amplified voltage 180 degrees out of phase appears between the anode and cathode. The applied voltage and amplified voltage effectively act in series aiding to produce a reactive current through the grid to anode capacity of the tube and this reactive current is many times larger than that provided by the input voltage alone. The reactive current is variable by varying the anode to cathode voltage as described above. Thus, my circuit has an effective input capacity that can be varied through a wider range than has been possible in circuits known heretofore. In the operation of my circuit, also, due to the differentially applied grid bias voltages, certain circuit non-linearities are cancelled in a manner well known in the art as "push-pull" action. This will be shown mathematically in the detailed description which follows:

The reactance circuit of my invention is not limited to use in modulators but on the contrary, is useful anywhere a variable capacitive reactance is needed. It is of particular interest in frequency modulation of the unstable oscillators depending on a resonant circuit or stable types such as crystal oscillators, and in phase shifting circuits, where improved performance and circuit simplicity as compared to the conventional reactance tube is desired.

Figure 1:
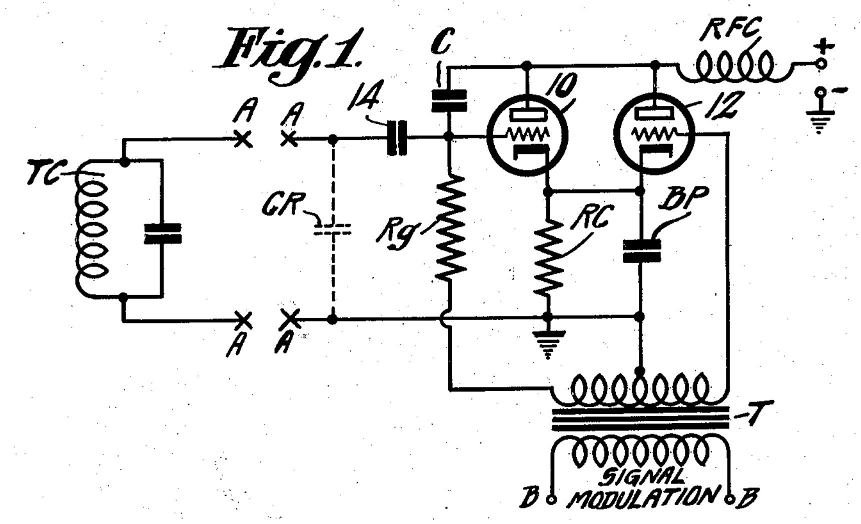
Figure 2:
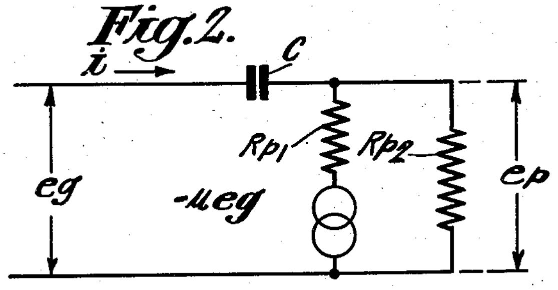
Figure 3:
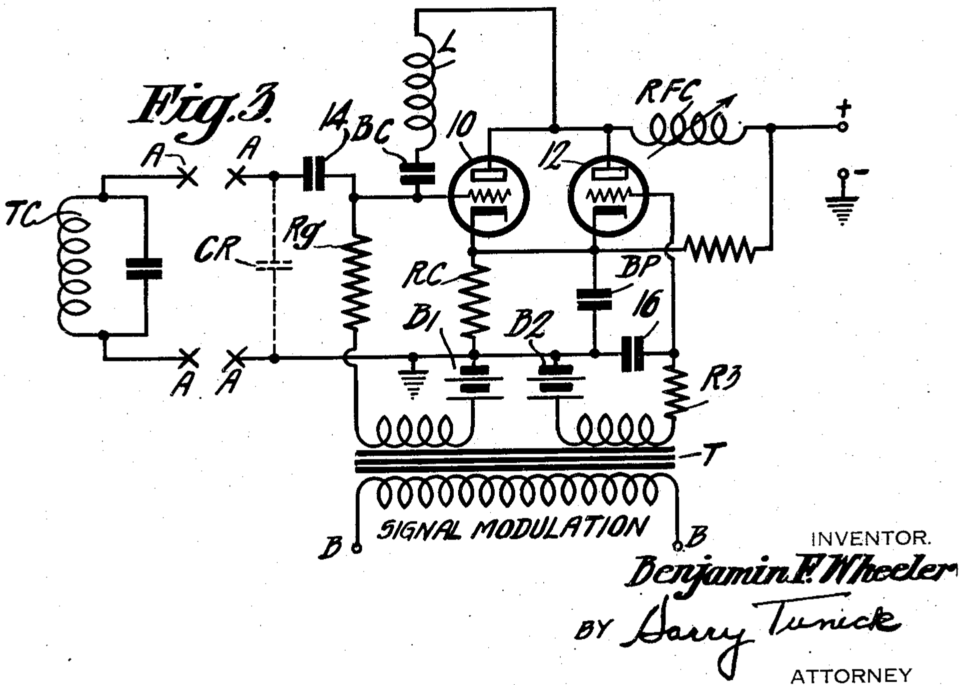

In describing my invention in detail, reference will be made to the attached drawings, wherein:

Fig. 1 illustrates by circuit element and circuit element connections the essential features of a reactance circuit arranged in accordance with my invention, Fig. 2 is an equivalent circuit diagram illustrating the manner in which my reactance circuit operates to provide a capacity which varies linearly over a wide range in accordance with a control potential, and Fig. 3 is a modification of the arrangement of Fig. 1.

In Fig. 1, tube 10 is the amplifier tube and tube 12 is the variable impedance tube. The tubes have their anodes tied together and connected by a radio frequency choke RFC to the positive terminal of a source of potential. The tubes have their cathodes tied together and connected to ground by a biasing resistor RC which is shunted by a large capacitor BP reducing the alternating current impedance between the cathodes and ground to a negligible value. The purpose of RC is to provide a fixed bias of optimum value on the control grids of both tubes. This bias may be supplied by RC alone or the same may be supplied in part by a bias source in the lead between the mid point on the secondary winding of transformer T and ground or such a bias source may be used alone. In some cases, tubes 10 and 12 may have different characteristics and/or operate best with different biases. Then an arrangement as illustrated in Fig. 3 may be used. The grid bias circuit of tube 10 includes a separate source B1 which may apply a different bias to the grid of tube 10 than is applied by source B2 through resistor R3 to the grid of tube 12. Then the transformer may have two secondary windings and a single primary winding. The grid end of resistor R3 is connected to the cathodes and ground by the radio frequency by pass capacitor 16.

The anode of the tube 10 of Fig. 1 is coupled to its control grid by a capacitor C which may be the grid plate capacitance of the tube if of sufficient value. Grid resistor $R_g$ is connected between the control grid of tube 10 and one end of the secondary winding of transformer T while the grid of tube 12 is connected directly to one end of the secondary winding. If desired, a resistance and bypass capacitor to ground may be used in this lead to provide a symmetrical circuit for the modulating voltage. At the terminals AA is represented a capacitive reactance CR, the magnitude of which is variable in accordance with voltages applied to terminals BB. Therefore, terminals AA may be connected across the frequency determining element of an oscillator or any tuned circuit to control the tuning thereof. Such a tuned circuit TC is shown at the left of terminals AA. The capacitance CR presented to the tuned circuit may be augmented by additional capacitance should this be desirable. Capacitor 14 is inserted to block the short circuiting action of any external circuit on the modulating voltage. The resulting effect will be to vary the tuning of this circuit and its resonant frequency. This results in varying the frequency of an oscillator, including the circuit TC as part of its frequency determining reactance, in accordance with the voltages applied at the terminals BB. The voltages applied at the terminals BB may represent signals in which case, the tuning of the circuit and/or the oscillator frequency will be modulated in accordance with the signals. Where an inductive reactance effect variable through a wide range is desired, then the embodiment of Fig. 1 may be modified as illustrated in Fig. 3. The anode of tube 10 is connected to its control grid by an inductor L and a blocking capacitor BC. The inductor RFC may be variable if desired and may be used to tune out or compensate the stray anode to ground capacitance of the tube 12. Then when the impedance of tube 12, i. e., the anode circuit load of tube 10 is varied and the gain of tube 10 is at the same time varied by modulation of opposed phase, the alternating current amplified in the tube 10 is in effect added in series to the alternating current applied to the grid of tube 10 to produce in tube 10 a large reactive current which is primarily inductive in character. This provides at points AA an inductance which is variable through a wider range than is possible in known tube reactances.

The action of the circuit can best be described by reference to an equivalent circuit, Fig. 2. C represents the grid to anode capacitance of the left hand tube 10 of Fig. 1. $R_{p1}$ is the anode resistance and $-\mu eg$ is the equivalent voltage generated in the anode circuit of the left hand tube. $R_{p2}$ is the anode resistance of the right hand tube. $eg$ is the radio frequency voltage applied and $ep$ is the radio frequency voltage developed between the anodes and ground. $R_{p1}$ and $R_{p2}$ are functions of the grid voltage applied to the grids of the respective tubes. $R_p$ of each tube can also be expressed in the form $R_p=\mu/g$ where $g$ is the mutual conductance of the tube, and $\mu$ is the amplification factor of the tube.

We can now develop the equations for the input impedance of the circuit as follows, assuming the reactance of C is large compared with $R_{p1}$ and $R_{p2}$, and that $\mu$ is the same for both tubes:

$$ep=-\mu eg\frac{R_{p2}}{R_{p1}+R_{p2}}=-\mu eg\frac{\frac{R_{p2}}{\mu}}{\frac{R_{p1}}{\mu}+\frac{R_{p2}}{\mu}}=-\mu eg\frac{\frac{1}{g_2}}{\frac{1}{g_1}+\frac{1}{g_2}} \qquad (1)$$

$$i=jwC(eg-ep)=jwCeg\left(1+\frac{\mu g_1}{g_1+g_2}\right) \qquad (2)$$

By inspection it is seen that the input impedance is the same as that of a capacitor C multiplied by the factor in parenthesis. Therefore we can write $$\frac{Cin}{C}=\frac{\mu g_1}{g_1+g_2}+1 \qquad (3)$$

If the tubes have a linear $g$ versus grid voltage characteristic we can write $$g_1=g_0+g_\Delta \text{ and } g_2=g_0-g_\Delta \qquad (4)$$

where $g_0$ is the normal operating point (determined by the initial bias on both tubes) and $g_\Delta$ is the change in $g$ caused by the differential signal voltage applied to terminals BB. Then:

$$\frac{Cin}{C}=1+\frac{\mu(g_0+g_\Delta)}{2g_0}=1+\frac{\mu}{2}+\frac{\mu}{2}\left(\frac{(g_\Delta)}{g_0}\right) \qquad (5)$$

The input capacitance of the circuit is therefore a linear function of $g$, and in turn of the applied signal voltage.

It was initially stipulated that the reactance of C be large compared with $R_{p1}$ and $R_{p2}$. If this is not true, then the current $i$ will also contain an in-phase component which will present a resistive load to the oscillator, or other circuit across which CR is applied, the magnitude of which will vary depending on the magnitude of $R_{p1}$ and $R_{p2}$ in parallel which is $$\frac{1}{R}=\frac{1}{R_{p1}}+\frac{1}{R_{p2}}=\frac{g_1}{\mu}+\frac{g_2}{\mu}=\frac{g_1+g_2}{\mu} \qquad (6)$$

$$R=\frac{\mu}{g_1+g_2}=\frac{\mu}{2g_0} \qquad (7)$$

This loading is not a function of $g_\Delta$, and therefore remains constant during modulation. This is a very desirable characteristic.

In the practical application of my circuit, there will be an undesirable capacitive reactance between the anodes and ground, both in the tubes and in the circuit wiring. To overcome this, RFC may be designed to have an inductive reactance approximately equal to the capacitive reactance. In experimental circuits I have used, however, this compensation has not always been found necessary.

It will be noted that this circuit is somewhat similar in some respects to that shown in Jones U. S. Patent #1,777,410, Fig. 2, which has been used previously for similar purposes. In that circuit, however, only a single tube, equivalent to my tube 10, is used and $R_{p2}$ is replaced by a fixed load resistance, whereas I use tube 12. It is obvious that with that circuit the resistive load presented to the oscillator will vary with the modulation signal voltage. For this circuit, an equation similar to (5) can be developed:

$$\frac{Cin}{C}=1+\frac{\mu g_1 R_L}{\mu+g_1 R_L} \qquad (8)$$

which is obviously not linear for variations of $g_1$. Moreover, only ½ the capacitance variation provided by my circuit is obtained by Jones.

Rothe (U. S. Patent 2,088,439) has also described a scheme similar in some respects, see for example, his Figure 4. Here his tube 2 provides the variable anode resistance which I call $R_{p2}$. However, Rothe does not simultaneously apply modulating potential to the grid of his tube 1. He, therefore, obtains only ½ the capacitance variation that I obtain, and the resistive loading component of the input impedance is variable with the modulating voltage. For Rothe's circuit, an equation similar to my Equation 5 can also be obtained:

$$\frac{Cin}{C}=1+\frac{\mu g_0}{2g_0-g_\Delta} \qquad (9)$$

which is also obviously non-linear for variations of $g^\Delta$. Another circuit that is widely used is the "reactance tube" where the radio frequency grid voltage is phased 90° from the radio frequency plate voltage. Such an arrangement is shown in Crosby's U. S. Patent 2,279,659 dated April 14, 1942. The reactance presented to the oscillator is due to the R.-F. plate current of the tube. Since the R.-F. plate current of most tubes is limited this means that the frequency shift obtainable is dependent on the R.-F. plate voltage applied to the tube, which should be low. This results in a low ratio of R.-F. grid to plate voltage which is sometimes difficult to obtain with simple phasing circuits. While my circuit also requires a relatively low R.-F. voltage across the terminals AA (in order not to have a grid voltage swing on tube 10 that exceeds the linear operating range of the tube), the necessity for a low R.-F. plate voltage in the reactance tube circuit makes necessary considerably more complicated circuits to obtain the 90° phase relation between the grid and plate voltages. For example, the simplest means for obtaining this phase relation is a resistance-capacitance or resistance-inductance phase shift circuit. This requires an R.-F. plate to grid voltage ratio on the order of 10 to 1 to obtain 90° shift. In order to obtain the maximum reactive plate current, however, a much smaller ratio is desirable. While phasing circuits are known to the art which will permit this low ratio, they are appreciably more complicated.

My improved reactance has numerous advantages including the following:

1. Simplicity.
2. Minimum number of components.
3. Linear operation.
4. "Push-pull" action with respect to signal voltages.
5. Constant loading on oscillator.
6. No phasing circuits required.
7. Large effective capacity variation.
8. No difficulty with parasitic oscillations.

For one particular application which contemplates direct frequency modulation of a quartz crystal oscillator, the advantages are quite important.

What is claimed is:

1. A variable reactor including two tubes each having a control electrode, an anode and a cathode, means for biasing the control electrode of each tube relative to its cathode by appropriate potentials, a source of direct current potential for the anodes of the tubes, connections for including the output impedance of one tube as the anode to cathode impedance of the other tube, a reactance coupling the anode of the other tube to its control electrode, and connections for controlling the impedance of said one tube and the gain of said other tube differentially in accordance with control potentials, whereby a reactive effect variable in accordance with said control potentials is developed between the control electrode and cathode of said other tube when the said control electrode is excited by alternating current.

2. A variable reactor including two tubes each having a control electrode, an anode and a cathode, means for biasing the control electrode of each tube relative to its cathode by appropriate potentials, a source of direct current potential for the anodes of the tubes, connections for including the output impedance of one tube as the anode to cathode impedance of the other tube, a capacitor coupling the anode of the other tube to its control electrode, and connections for controlling the impedance of said one tube and the gain of said other tube differentially in accordance with control potentials, whereby a correspondingly varied capacitive effect appears between the control electrode and cathode of the other tube.

3. A variable reactor including two tubes each having a control electrode, an anode and a cathode, means for biasing the control electrode of each tube relative to its cathode by appropriate potentials, a source of direct current potential for the anodes of the tubes, connections for including the output impedance of one tube as the anode to cathode impedance of the other tube, an inductor coupling the anode of the other tube to its control electrode, and connections for controlling the impedance of said one tube and the gain of said other tube differentially in accordance with control potentials, whereby a correspondingly varied inductive effect appears between the control electrode and cathode of said other tube.

4. A reactor as recited in claim 1 including an inductor in the anode circuit of said one tube for tuning out the anode capacity thereof.

5. A variable reactor including two electron discharge devices each having electrodes including an anode, a cathode and a control electrode, connections putting the anode to cathode impedances of said devices in parallel, a biasing circuit connecting the control electrode of each device to its cathode, a direct current potential source connecting the anode of each of said devices to its cathode, a reactance connecting the anode of one device to the control electrode of said one device, and connections for controlling the gain of said one device and the impedance of the other device differentially in accordance with control potentials.

6. A variable reactor including two electron discharge devices each having electrodes including an anode, a cathode and a control grid, a biasing circuit connecting the control grid of each device to its cathode, a direct current potential source connecting the anode of each of said devices to its cathode, the arrangement being such that the output impedances are in parallel, a capacitor connecting the anode of one device to the control grid of said one device, and connections for controlling the gain of said one device and the impedance of the other device differentially in accordance with control potentials.

7. A variable capacitor including two electron discharge systems each having electrodes including an anode, a cathode and a control grid, a biasing circuit connecting the cathode of each system to its control grid, a capacitor whose reactance is high as compared to the plate impedance of one system connecting the anode of said one system to the control grid of said one system, and connections for controlling the gain of said one system and the impedance of the other system differentially in accordance with control potentials.

8. A variable capacitor including two electron discharge systems each having electrodes including an anode, a cathode and a control grid, a biasing circuit for said systems including a common resistor connecting the cathodes of said systems to the control grids of said systems, a direct current potential source connecting the anodes of said systems together and to the cathodes of said systems, a capacitor connecting the anode of one system to the control grid of said one system, and a modulation source coupled differentially to the control grids of said systems, whereby relatively large capacity variations free of amplitude variations are developed between the control grid and cathode of the said one system.

9. A variable reactor including two electron discharge devices each having electrodes including an anode, a cathode and a control grid, a separate biasing circuit connecting the control grid of each device to its cathode, a substantially direct connection between the anodes of the devices, a substantially direct connection between the cathodes of the devices, a direct current potential source connecting the anode of each of said devices to its cathode, a reactor in the connection to the anode of one device, an inductor connecting the anode of the other device to the control grid of said other device, and connections for controlling the gain of said other device and the impedance of the one device differentially in accordance with control potentials.

BENJAMIN F. WHEELER.

REFERENCES CITED

The following references are of record in the file of this patent:

UNITED STATES PATENTS

| Number | Name | Date |
|---|---|---|
| 2,088,439 | Rothe | July 27, 1937 |
| 2,248,132 | Smith | July 8, 1941 |
| 2,430,126 | Korman | Nov. 4, 1947 |